Patented Dec. 26, 1950

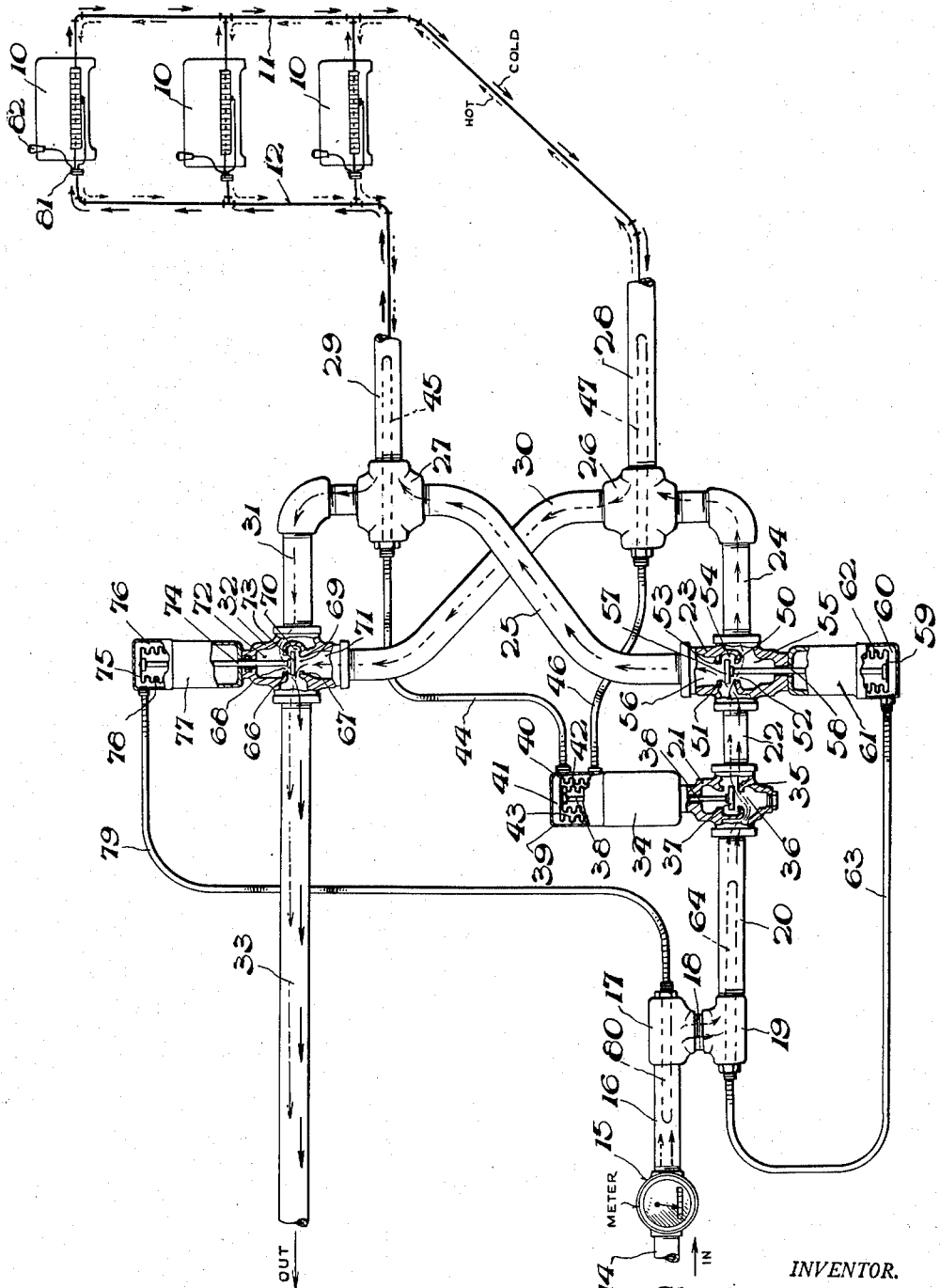

2,535,892

UNITED STATES PATENT OFFICE 2,535,892

CONTROL FOR SYSTEMS USING EITHER HEATING OR COOLING MEDIUM

Charles D. Branson, Knoxville, Tenn., assignor to Robertshaw-Fulton Controls Company, Knoxville, Tenn., a corporation of Delaware Application August 2, 1948, Serial No. 41,963

11 Claims. (Cl. 236—1)

This invention relates to temperature responsive controls and more particularly to temperature responsive controls for use in systems comprising a central plant for circulating either a heating or a cooling medium and automatically operable to properly condition the system when changing over from a heating to a cooling medium or vice versa.

Where a central plant is used for supplying air conditioning medium to a plurality of users, whether they be different tenants in the same building or occupants of a plurality of buildings, having regard to the fact that different users will consume different quantities of air conditioning medium to suit their particular requirements, it has been proposed to determine the payment to be made by each user by metering the quantity of medium used by him over a predetermined period of time and, knowing the differential in temperature between the inflowing and outflowing medium, the charge made may be directly correlated with the quantity of heat involved in each user's individual consumption. When a central plant of this character is used both for supplying heating medium in cold whether and a cooling medium in hot weather it is desirable that the system shall include provisions whereby it is automatically conditioned from the character of the medium being circulated so as to properly handle the cooling medium or the heating medium as the case may be.

It is an object of this invention to provide a system of the type characterized with automatic means responsive to the temperature of the medium being circulated for properly predetermining the direction of flow of said medium with respect to the elements used in the system.

Another object of this invention is to provide a system of the type last characterized with means whereby there will be a predetermined heat differential between the medium being delivered and the medium being returned whether such medium be a heating medium or a cooling medium.

Another object of this invention is to provide a system of the type characterized with a temperature regulator for predetermining the temperature differential to be maintained between the medium being delivered and the medium being returned together with automatic means dependent upon the temperature of the medium for predetermining the direction of flow of said medium with respect to said regulator.

Another object of this invention is to provide a system of the type characterized with automatic mechanism for reversing the direction of flow through the consumer's equipment as the medium delivered is changed from a heating medium to a cooling medium or vice versa.

Another object of this invention is to provide a system of the type last characterized which includes automatic mechanism for predetermining the differential in temperature between the medium delivered and the medium returned whether such medium be a heating medium or a cooling medium.

Another object of this invention is to provide a system of the type first characterized wherein all of the regulators used may be of simple construction, easily installed and accurate in operation.

Another object of this invention is to provide a system of the type characterized which is simple in arrangement and easily adjustable, so that the temperature differential between the medium delivered and the medium returned may be easily predetermined and thereafter known with certainty whereby, when combined with a suitable metering device for predetermining the quantity of medium circulated through the individual user's equipment, a satisfactory basis for fixing charges based on number of heat units involved may be provided.

Other objects will appear as the description of the invention proceeds.

The invention is capable of receiving a variety of mechanical expressions only one of which has been illustrated schematically on the accompanying drawing. It is therefore to be expressly understood that the drawing is for purposes of illustration only and is not to be construed as a definition of the limits of the invention, reference being had to the appended claims for that purpose.

Referring in detail to the accompanying drawing, there is illustrated, for the most part diagrammatically, but with certain parts broken away to facilitate understanding, a system of the character hereinbefore referred to, the automatic control being shown to a larger scale than the remainder of the system.

In the system diagrammatically illustrated a plurality of heat exchange units 10 are shown as cross connected between conduits 11 and 12, typifying the air conditioning equipment for heating or cooling of a single user. However, as will be apparent to those skilled in the art the units 10 may also typify the equipment of separate tenants in a single building or equipment in a plurality of separate buildings. A central plant (not shown) for supplying either heating or cooling medium, depending upon the season of the year, delivers the medium to be circulated through the units 10 to a conduit 14 in which may be disposed any suitable meter 15. If said meter 15 is to measure the quantity of medium consumed by an individual user as will be assumed in the further explanation of the present invention, then the automatic crossover and regulator to be described will be individual to each user. However, as will be apparent, the meter may be associated with each of the units 10 and the automatic crossover and regulator to be described may control the supply of medium to all of said units. In the ensuing description, however, it will be assumed that the automatic crossover and regulator to be described are individual to each consumer, and therefore the meter 10 is the meter by which is measured the quantity of heating or cooling medium delivered to such consumer.

From the meter 15 extends a supply conduit 16 of any suitable size, length and character which communicates with a housing 17 through which the circulating medium is caused to flow. Housing 17 has any suitable connection 18 leading from its interior to the interior of a housing 19 from which extends a conduit 20 leading to the interior of the housing 21 of a thermostatically controlled valve mechanism to be described. Conduit 22 connects the interior of housing 21 with the interior of the housing 23 of a second thermostatically controlled valve mechanism to be described, and in communication with the interior of said housing 23 are two conduits 24 and 25 of any suitable length, size and character that communicate with the interior of housings 26 and 27, respectively. Housings 26 and 27 are in communication with conduits 28 and 29 which are respectively in communication with the aforesaid conduits 11 and 12, respectively, conduits 28 and 29 being of any suitable length, size and character so as to dispose the control under discussion conveniently with respect to the units 10. Each of said housings 26 and 27 is in communication with a second conduit, 30 and 31, respectively, of any suitable length, size and character, both of said conduits communicating with the interior of the housing 32 of a third thermostatically controlled valve mechanism to be described. Also in communication with the interior of housing 32 is a return conduit 33 of any suitable length, size and character for returning the circulating medium to the central plant.

The thermostatically controlled valve mechanism whose housing is indicated at 21 is for the purpose of maintaining a predetermined temperature differential between the medium delivered to the units 10 and the medium returned from said units. Any suitable thermostatically controlled valve mechanism for maintaining a predetermined drop in temperature between two points in a system may be used at this point. The construction illustrated diagrammatically is of the type disclosed in the patent to Reeder, No. 2,211,672, of August 13, 1940 and, as shown in said patent, is preferably made adjustable so that the temperature drop between the selected points may be closely predetermined. As illustrated, housing 21 is provided with an interior partition 35 in which is a valve port 36. Cooperating with said port 36 is a valve member 37 connected to a stem 38 that is operatively associated with the movable end walls of two expansible and collapsible chambers. As here shown, a rigid cup-shaped exterior wall 39 is mounted on or is an extension of the housing member 34 and has hermetically secured therein in any suitable way an expansible and collapsible corrugated tubular wall or bellows 40 forming an expansible and collapsible chamber 41 between said bellows and said cup-shaped wall. Disposed interiorly of said bellows 40 is a second expansible and collapsible corrugated tubular wall or bellows 42 which is hermetically secured in the cup-shaped wall in any suitable way and in conjunction with said bellows 40 forms an expansible and collapsible chamber 43 between the two. The movable end wall of bellows 42 is operatively connected to the stem 38 for operating the valve member 37 under the control of the combined relative expansions and contractions of the two chambers 41 and 43.

Connected to the cup-shaped member 39 in any suitable way and in communication with the chamber 41 is a conduit 44 of any suitable length, size and construction, preferably a capillary tube, which leads to a temperature responsive element in the form of a bulb 45 mounted in any suitable way in the housing 27 and preferably extending into the conduit 29. Also mounted on said cup-shaped member 39 in any suitable way and in communication with the expansible and collapsible chamber 43 is a conduit 46 of any suitable length, size and construction, preferably a capillary tube, extending to a temperature responsive element in the form of a bulb 47 mounted in any suitable way in the housing 26 and preferably extending into the conduit 28. The bulb 45 with its expansible and collapsible chamber 41 in communication through the conduit 44 is charged with any suitable thermosensitive fluid so as to effect expansion and contraction of the chamber 41 in response to variations of temperature at the bulb 45. Similarly, the bulb 47 together with its expansible and collapsible chamber 43 in communication through the conduit 46 is charged with a suitable thermosensitive fluid so as to effect expansion and contraction of the chamber 43 in response to variations of temperature at the bulb 47. The construction is such that the composite effect of the expansions and contractions of the two chambers 41 and 43 are transmitted through the stem 38 to the valve member 37 so as to control the flow of medium through the port 36 to the end that a definite predetermined drop of temperature may exist between bulbs 45 and 47 as fully explained in the aforesaid patent to Reeder. As before pointed out, the housing member 34 for this differential thermostatically controlled valve mechanism preferably includes provisions for adjusting the temperature differential to be maintained between the bulbs 45 and 47 as fully disclosed in said patent to Reeder. While a differential valve mechanism of the type disclosed in said Reeder patent is illustrated herein, it is to be expressly understood that any other suitable differential thermostatically controlled valve mechanism may be disposed at 21 so as to maintain a predetermined temperature difference between the housings 26 and 27 or their associated conduits 28 and 29.

Housing 23 has associated therewith any suitable thermostatically controlled valve mechanism for determining whether the circulation of medium leaving said housing shall be through the conduit 24 or the conduit 25. As illustrated, the thermostatically controlled valve mechanism is of the type disclosed in the patent to Giesler, No. 1,885,711, dated November 1, 1932. The housing 23 is shown as provided interiorly with a pair of partitions 50 and 51 in which are provided suitable valve ports 52 and 53. The chamber 54 between said partitions is in communication with the conduit 22, while the chambers 55 and 56 at the outer sides of said partitions are respectively in communication with the conduits 24 and 25. Disposed in said chamber 54 is a valve member 57 of any suitable character connected to a stem 58 that is operatively associated with movable end wall 59 of an expansible and collapsible chamber 60 formed between a cup-shaped wall 61, mounted on the housing 23 in any suitable way, and an expansible and collapsible corrugated tubular wall or bellows 62 hermetically connected in any suitable way to the interior of said cup-shaped wall. In communication with said chamber 60 is a conduit 63 of any suitable length, size and construction, preferably a capillary tube, leading to a temperature responsive element in the form of a bulb 64 mounted in any suitable way in the housing 19 and preferably extending into the conduit 20 as shown. Bulb 64 together with its chamber 60 in communication through the conduit 63 is charged with any suitable thermosensitive fluid so that upon expansion or contraction of the chamber 60 in response to a sufficient change of temperature at bulb 64 the valve member 53 will be moved from one of its positions to the other, closing the port 53 or the port 52, respectively, to compel all of the medium circulating through the housing 23 to leave by the conduit 24 or by the conduit 25, respectively.

The housing 32 is also provided with any suitable thermostatically controlled valve mechanism for predetermining whether the flow of circulating medium shall be through the conduit 30 or the conduit 31. As here illustrated, the thermostatically controlled valve mechanism is of the construction disclosed in the aforesaid patent to Giesler, the housing being provided with interior partitions 66 and 67 in which are disposed valve ports 68 and 69, respectively. The chamber 70 between said partitions is in communication with the return conduit 33, while the chambers 71 and 72 at the outer sides of said partitions are respectively in communication with the conduits 30 and 31. Disposed in said chamber 70 is any suitable valve member 73 connected to a valve stem 74 operatively associated with the movable end wall 75 of an expansible and collapsible chamber 76 formed between a cup-shaped housing 77 mounted on the housing 32 in any suitable way and an inner expansible and collapsible corrugated tubular wall or bellows 78 hermetically connected to said cup-shaped wall 77 in any suitable way. Chamber 76 is in communication with a conduit 79 of any suitable length, size and construction, preferably a capillary tube, which leads to a temperature responsive element in the form of a bulb 80 mounted in any suitable way in the housing 17 and preferably extending into the conduit 16. Bulb 80 together with its chamber 76 in communication through the conduit 79 is charged with any suitable thermosensitive fluid so that upon a sufficient change of temperature at the bulb 80 chamber 76 will be expanded or contracted to move valve member 73 from one of its positions to the other, closing the port 69 or the port 68, respectively, so as to place conduit 30 or conduit 31, respectively, in communication with return conduit 33.

Each of the thermostatically controlled valve mechanisms associated with housings 23 and 32 are preferably made adjustable as fully disclosed in the aforesaid patent to Giesler. While the thermostatically controlled valve mechanisms associated with the housings 23 and 32 have been illustrated as of the type disclosed in said Giesler patent it is to be expressly understood that any other suitable thermostatically controlled valve mechanism may be used for predetermining the flow through the ports 52 or 53, on the one hand, and the ports 68 and 69, on the other hand, pursuant to changes of temperature at the bulbs 64 and 80, respectively, such as would occur upon changing from a heating to a cooling medium or vice versa.

Assuming that the differential valve mechanism associated with the housing 21 is so constructed that the temperature differential to be maintained by the expansion and contraction of the chambers 41 and 43 is such that chamber 41 determines the lower temperature, it is apparent that the circulating medium of lower temperature must flow in heat interchanging relationship with the bulb 45 while the medium of higher temperature must flow in heat interchanging relationship with the bulb 47. In the case of a heating medium the lower temperature is on the return side of the heat exchanger units, while in the case of a cooling medium the lower temperature is at the delivery side of the heat exchanger units. Therefore, in order that the medium at the lower temperature shall always flow into heat interchanging relationship with the bulb 45 while the medium of higher temperature shall always flow into heat interchanging relationship with the bulb 47 it is necessary that the flow of circulating medium be changed or crossed over whenever a switch is made from heating medium to cooling medium or vice versa. The control as heretofore described effects this cross over automatically.

Assume that heating medium is received by conduit 14 from the central unit. After it flows through the meter 15 it flows through the conduit 16, housing 17, connection 18, housing 19 and conduit 20 as indicated by the dotted arrows. Contact of the heating medium with the bulb 64 effects expansion of its communicating chamber 60, moving the valve member 57 to close the port 53. Therefore, the heating medium from conduit 20, after flowing through housing 21 and conduit 22, flows from the chamber 54 through port 52 into chamber 55 and thence through conduit 24 and housing 26. Whether the medium shall leave housing 26 through conduit 28 or through conduit 30 depends upon the position of valve member 73. Contact of the heating medium with bulb 80 effects an expansion of the chamber 76, causing valve member 73 to close the port 69 and thereby prevent flow of said medium through the conduit 30. Hence the heating medium flows from conduit 28 to the conduit 11, through the units 10, and out through conduit 12 and conduit 29. From conduit 29 the heating medium flows through conduit 31 into chamber 72 and thence through the now open port 68 to return conduit 33.

Assume now that a cooling medium is delivered by the central plant to conduit 14. After passing through the meter 15 the cooling medium flows through conduit 16, housing 17, connection 18 and housing 19 into conduit 20. Contact of said medium with bulb 64 causes a contraction of chamber 60 moving valve member 53 to close port 52 and open port 53. Therefore, the cooling medium, as shown by the solid arrows, after flowing through housing 21 and conduit 22 will enter chamber 54 and thence flow through port 53, conduit 25 and housing 27. Whether the cooling medium shall flow from housing 27 to conduit 29 or conduit 31 again depends on the position of the valve member 73. Contact of the cooling medium with the bulb 80 effects contraction of chamber 76 to move valve member 73 to close port 68 and thereby prevent flow of the medium through conduit 31. Hence the cooling medium flows through the conduit 29 to conduit 12 and thence through the units 10 in the opposite direction from the flow when heating medium is being circulated. From units 10 the cooling medium returns through conduits 11 and 28, housing 26 and conduit 30, and as port 69 is now open the medium flows into chamber 70 and out through return conduit 33.

In either event, the medium in heat interchange relationship with the bulb 45 is at a lower temperature than the medium in heat interchanging relationship with the bulb 47. Therefore, under the composite action of the expansible and collapsible chambers 41 and 43 as determined by the temperature variations at bulbs 45 and 47, valve member 37 is properly positioned to regulate the flow of medium through the port 36 for producing the predetermined temperature drop between bulbs 47 and 45 as set by the adjustment of the differential valve at 21.

The temperature drop between the medium being supplied and the medium being returned to the central plant being thus predetermined by the setting of the differential valve at 21 and the quantity of medium flowing through units 10 being determinable from the meter 15, it is possible to exactly compute the number of heat units delivered or absorbed by the consumer's units 10 and thereby base his charges accurately on his consumption.

Each of the units 10 may have its own thermostatic control so as to maintain the desired temperature in each of the spaces being conditioned by a unit 10. This is diagrammatically illustrated in the drawing wherein each of the units 10 is shown as provided with a thermostatically controlled valve mechanism 81 actuated by a thermostat 82 of any suitable character subjected to the temperature of the ambient. Any suitable thermostatically controlled valve mechanism may be used for so regulating the units 10 individually.

It will therefore be perceived that the present invention provides a simple, certain and automatic mechanism whereby a predetermined temperature difference may be maintained between the incoming and outgoing circulating medium whether that medium is a heating medium or a cooling medium, and proper circulation of the medium with respect to the temperature responsive elements of the control is automatically effected by valve mechanism responsive to the temperature of the medium being circulated and responding automatically thereto to cause the direction of circulation to conform with the requirements of the differential valve mechanism which maintains the predetermined temperature difference between inflowing and outflowing medium. All of the elements composing the control may be of standard construction, and the control can be easily installed, it occupies little space, and it yet assures accurate measurement of the quantity and temperature drop of the medium being circulated whether it be a heating medium or a cooling medium.

While the embodiment of the invention illustrated on the drawing has been described with considerable particularity, it is to be expressly understood that the invention is not limited thereto as the same is capable of receiving a variety of mechanical expressions, as will now be apparent to those skilled in the art, while changes may be made in details without departing from the spirit of this invention. The automatic control provided by the present invention may be situated in any convenient location with respect to the units 10, and the thermostatically controlled valve mechanisms employed may be variously located with respect to the supply and return conduits and be of any suitable construction to effect operations in conformity with the foregoing explanation. The meter 15 could obviously be installed in communication with the return conduit, and other changes in details of construction, relative arrangement, etc., will readily suggest themselves to those skilled in the art. Reference is therefore to be had to the appended claims for a definition of the invention.

What is claimed is:

1. In a system for circulating either a heating medium or a cooling medium through heat exchangers, in combination with a supply conduit and a return conduit for the circulating medium and a pair of conduits through which the medium flows to and from the heat exchangers, thermostatically controlled valve mechanism for maintaining a predetermined temperature difference between the medium flowing through the supply and return conduits and including a pair of temperature responsive elements respectively subjected to the temperature of the medium flowing through the conduits of said pair, cross over connections connecting each of said supply and return conduits to both of said pair of conduits, and thermostatically controlled valve mechanism subjected to the temperature of the medium flowing through said supply conduit and cooperating with said cross over connections for predetermining the direction of flow of said medium through said pair of conduits depending upon whether it is a heating medium or a cooling medium.

2. In a system for circulating either a heating medium or a cooling medium through heat exchangers, in combination with a supply conduit and a return conduit for the circulating medium and a pair of conduits through which the medium flows to and from the heat exchangers, thermostatically controlled valve mechanism for maintaining a predetermined temperature difference between the medium flowing through the supply and return conduits and including a pair of temperature responsive elements respectively subjected to the temperature of the medium flowing through the conduits of said pair, cross over connections connecting each of said supply and return conduits to both of said pair of conduits, and thermostatically controlled valve mechanism subjected to the temperature of the medium flowing through said supply conduit and cooperating with said cross over connections to cause one of said temperature responsive elements always to be subjected to the cooler medium and the other of said temperature responsive elements always to be subjected to the hotter medium flowing through said pair of conduits whether the medium be a heating medium or a cooling medium.

3. In a system for circulating either a heating medium or a cooling medium through heat exchangers, in combination with a supply conduit and a return conduit for the circulating medium and a pair of conduits through which the medium flows to and from the heat exchangers, thermostatically controlled valve mechanism for maintaining a predetermined temperature difference between the medium flowing through the supply and return conduits and including a pair of temperature responsive elements respectively subjected to the temperature of the medium flowing through the conduits of said pair, cross over connections connecting each of said supply and return conduits to both of said pair of conduits, and a pair of thermostatically operated valve mechanisms including temperature responsive elements subjected to the medium flowing through said supply conduit for controlling said cross over connections and reversing the direction of circulation through said pair of conduits upon change from heating medium to cooling medium or vice versa.

4. In a system for circulating either a heating medium or a cooling medium through heat exchangers, in combination with a supply conduit and a return conduit for the circulating medium and a pair of conduits through which the medium flows to and from the heat exchangers, thermostatically controlled valve mechanism for maintaining a predetermined temperature difference between the medium flowing through the supply and return conduits and including a pair of temperature responsive elements respectively subjected to the temperature of the medium flowing through the conduits of said pair, cross over connections connecting each of said supply and return conduits to both of said pair of conduits, a valve mechanism including a housing in communication with said supply conduit and having a pair of outlets respectively communicating with said cross over connections and a pair of ports for controlling said outlets, a valve member in said housing for controlling said pair of ports, a thermostat having a temperature responsive element subjected to the medium flowing through said supply conduit and operatively connected to said valve member, a second valve mechanism including a housing in communication with said return conduit and having a pair of inlets respectively communicating with said cross over connections and a pair of ports for controlling said inlets, a valve member in said housing for controlling said pair of ports, and a thermostat having a temperature responsive element subjected to the medium flowing through said supply conduit and operatively connected to said last named valve member.

5. In a system for circulating either a heating medium or a cooling medium through heat exchangers, in combination with a supply conduit and a return conduit for the circulating medium and a pair of conduits through which the medium flows to and from the heat exchangers, the combination of a thermostatic differentially controlled valve mechanism having a housing in communication with the supply conduit and including a pair of temperature responsive elements respectively subjected to the temperatures of the medium flowing through said pair of conduits, a pair of thermostatically controlled valve mechanisms having housings in communication with said first named housing and with said return conduit respectively and including temperature responsive elements subjected to the medium flowing to said first named housing, and cross connections between said pair of housings and said pair of conduits controlled by said pair of thermostatically controlled valve mechanisms to cause circulation of said medium through said cross connections in such a direction that whether heating or cooling medium is being circulated one of the temperature responsive elements of said differential valve mechanism is always subjected to the cooler medium and the other of said temperature responsive elements is always subjected to the hotter medium flowing through said pair of conduits.

6. In a system for circulating either a heating medium or a cooling medium through heat exchangers, in combination with a supply conduit and a return conduit for the circulating medium and a pair of conduits through which the medium flows to and from the heat exchangers, means for maintaining a predetermined drop in temperature in the medium between said pair of conduits whether a heating medium or a cooling medium is being circulated, said means comprising a valve housing in communication with said supply conduit and thermostatic differentially controlled means for operating said valve mechanism including a pair of temperature responsive elements respectively subjected to the temperature of the medium flowing through said pair of conduits, and means whereby the hotter medium and the cooler medium in said pair of conduits always flow in heat interchanging relationship with the same temperature responsive elements respectively whether a heating medium or a cooling medium is being circulated, said last named means comprising a valve mechanism having a housing in communication with said supply conduit and a pair of outlets communicating respectively with said pair of conduits, a valve mechanism having a housing in communication with said return conduit and having a pair of inlets respectively communicating with said pair of conduits, and two thermostats operatively connected to said last two named valve mechanism respectively and each having a temperature responsive element subjected to the medium flowing through said supply conduit.

7. In a system for circulating either a heating medium or a cooling medium through heat exchangers, in combination with a supply conduit and a return conduit for the circulating medium and a pair of conduits through which the medium flows to and from the heat exchangers, means for maintaining a predetermined drop in temperature in the medium between said pair of conduits whether a heating medium or a cooling medium is being circulated, said means comprising a valve housing in communication with said supply conduit and thermostatic differentially controlled means for operating said valve mechanism including a pair of temperature responsive elements respectively subjected to the temperature of the medium flowing through said pair of conduits, and means for reversing the direction of flow of the medium through said pair of conduits depending upon whether a heating medium or a cooling medium is being circulated, said last named means comprising a pair of valve mechanisms having housings respectively in communication with said supply and return conduits and each in communication with both of said first named pair of conduits and including a valve member cooperating with a pair of ports for determining through which of the conduits in communication with said first named pair of conduits the circulating medium shall flow, and a pair of thermostats operatively connected to said valve members respectively and each including a temperature responsive element subjected to the medium flowing through said supply conduit.

8. In a system for circulating either a heating medium or a cooling medium through heat exchangers, in combination with a supply conduit and a return conduit for the circulating medium and a pair of conduits through which the medium flows to and from the heat exchangers, means for maintaining a predetermined drop in temperature in the medium between said pair of conduits whether a heating medium or a cooling medium is being circulated, said means comprising a valve housing in communication with said supply conduit and thermostatic differentially controlled means for operating said valve mechanism including a pair of temperature responsive elements respectively subjected to the temperature of the medium flowing through said pair of conduits, and means for reversing the direction of flow of the medium through said pair of conduits depending upon whether a heating medium or a cooling medium is being circulated, a valve housing in communication with both of said pair of conduits and in communication with said supply conduit, a valve housing in communication with both of said pair of conduits and with said return conduit, a pair of valve mechanisms in said last named housings respectively for selectively predetermining through which outlet and which inlet said medium shall flow, and a pair of thermostats operatively connected to said valve mechanisms respectively and each having a temperature responsive element subjected to medium flowing through said supply conduit.

9. In a system for circulating a heating medium or a cooling medium through heat exchangers, in combination with a supply conduit and a return conduit for the circulating medium and a pair of conduits through which the medium flows to and from the heat exchangers, a valve housing in communication with said supply conduit and connected to both of said pair of conduits, a second valve housing in communication with said return conduit and connected to both of said pair of conduits, valve mechanism in each of said housings and operable to reverse the direction of flow through said pair of conduits by selecting the connections through which the medium shall flow, a thermostat operatively connected to each of said valve mechanisms and having a temperature responsive element subjected to the medium flowing through said supply conduit, and thermostatically controlled valve mechanism in one of said conduits and having means responsive to the temperature of the medium flowing through both of said pair of conduits for maintaining a predetermined temperature drop therebetween.

10. In a system for measuring the units of heat involved in air conditioning systems in which either a heating medium or a cooling medium is to circulate through heat exchangers, in combination with a meter for measuring the quantity of medium being circulated, supply and return conduits one of which is in communication with said meter, and a pair of conduits through which the medium may flow to and from the heat exchangers, a valve mechanism in one of said conduits for controlling the flow of medium therethrough, thermostatic means operatively connected to said valve mechanism and having temperature responsive elements respectively subjected to the medium flowing through said pair of conduits, said thermostatically operated valve mechanism predetermining the difference in temperature in the medium respectively flowing through said supply and return conduits, and means for reversing the direction of flow through said pair of conduits when changing from a heating medium to a cooling medium or vice versa, said last named means including a pair of valve housings respectively in communication with said supply and return conduits and each having a pair of connections in communication with both of said pair of conduits, valve mechanism in each of said valve housings for predetermining through which of said pair of connections the medium may flow and thermostats operatively connected to each of said last named valve mechanisms and responsive to the temperature of the medium flowing through said supply conduit.

11. In a system for measuring the units of heat involved in air conditioning systems in which either a heating medium or a cooling medium is to circulate through heat exchangers, in combination with a meter for measuring the quantity of medium being circulated, supply and return conduits one of which is in communication with said meter, and a pair of conduits through which the medium flows to and from the heat exchangers, a valve mechanism in one of said conduits for controlling the flow of medium therethrough, said valve mechanism including a single valve member for predetermining the rate of flow through said conduits, a pair of thermostats operatively connected to said valve member and having temperature responsive elements respectively subjected to the medium flowing through said pair of conduits, and means for reversing the direction of flow through said pair of conduits on change from a heating medium to a cooling medium or vice versa, said last named means including a pair of thermostatically controlled valve members for controlling which of said pair of conduits shall be in communication with said supply conduit while connecting the other of said pair of conduits to said return conduit, said last named thermostats including temperature responsive elements subjected to the medium flowing through said supply conduit.

CHARLES D. BRANSON.

REFERENCES CITED

The following references are of record in the file of this patent:

UNITED STATES PATENTS

| Number | Name | Date |
|---|---|---|
| 2,182,691 | Crago | Dec. 5, 1939 |
| 2,353,889 | Giesler | July 18, 1944 |